Patented Nov. 8, 1927.

1,648,868

UNITED STATES PATENT OFFICE.

GEORGE I. RAY, OF CHARLOTTE, NORTH CAROLINA, ASSIGNOR TO RADIATOR SPECIALTY COMPANY, OF CHARLOTTE, NORTH CAROLINA, A CORPORATION OF NORTH CAROLINA.

COMPOSITION FOR REPAIRING LEAKS IN HOT-WATER SYSTEMS.

No Drawing.      Application filed April 12, 1927. Serial No. 183,242.

This invention relates to a composition of matter for stopping leaks in hot water circulating systems, such as automobile radiators, boilers, engine blocks, and the like, and is adapted to operate in such a manner as to permanently seal the leaks in such systems and at the same time keep the interior of the system clean.

I am aware that heretofore many leak stopping compositions have been used, but in many of these compositions there are ingredients which have a tendency to coat the interior of the system and thereby injure the same. It is an object of this invention to provide a leak stopping composition which will permanently seal the leaks in any hot water circulating system, and will also keep the interior of the system in good condition by preventing the formation of a coating on the interior of the system, and also in preventing the clogging of the system at any point.

I attain the above stated objects by placing a composition of matter into the system which is partially filled with water, said composition containing the ingredients in about the proportions named below:

| | Per cent. |
|---|---|
| Aluminum | 12 |
| Flax seed meal | 60 |
| Borax | 10 |
| Soap | 18 |

The proportions of the ingredients stated may be greatly varied without greatly affecting the efficiency of the composition for the purpose for which it is manufactured.

When the above-set forth composition is placed in a hot water circulating system, the ingredients act to permanently seal the leaks therein, and at the same time, the borax and soap suspend the other ingredients and also cleanse the interior of the system and prevent the interior from becoming coated with undesirable substances.

Although I do not desire to be bound by the explanation which will follow, I will endeavor to explain what actions and reactions take place when the composition is introduced into the system:

When this composition is placed in a hot water circulating system, which is filled with water to the desired level, the borax dissolves, and also parts of the flax seed meal dissolves, and the soap goes into colloidal solution. The soap acts as a suspending agent along with the mucilage from the flax seed meal, and the soap is stimulated or strengthened by the action of the borax, since the borax is a good detergent in itself. By the combined deflocculating influences of the above-named ingredients, the larger insoluble particles of the flax seed meal, as well as the smaller particles of the flax seed meal, and those of the aluminum are very largely suspended and prevented from forming and remaining in lumps in the lower part of the system, as in the bottom portion of an automobile radiator. The sealing of the leak would be accomplished by the sealing of the particles in the leak by the cementing action of the mucilage in the flax seed meal. There would also be a small amount of sodium hydroxide which would aid in the sealing operation.

The fact that borax has less action on aluminum than sodium carbonate and other like substances, would make this a very good leak stopping composition for automobiles having engines made of aluminum. However, the borax would furnish enough sodium hydroxide to prevent the separation of any fatty acids from the soap, and also prevent the oil in the flax seed meal from adhering to the inner walls of the system.

In addition to the deterging action of the borax, it also acts as an insecticide to kill all undesirable germ life in the flax seed meal, and would prevent the souring effect which flax seed meal seems to undergo in some instances.

In the specification I have set forth a preferred embodiment of my invention, and a description of what I think happens in the system when my composition is introduced therein, and although descriptive terms are used, they are used in a generic and descriptive sense, and not for purposes of limitation, the scope of the invention being set forth in the appended claims.

I claim:

1. A composition for stopping leaks in hot water circulating systems comprising a mixture of aluminum, flax seed meal, borax and soap.

2. A composition for stopping leaks in hot water circulating systems comprising a mixture of aluminum, flax seed meal and borax.

In testimony whereof I affix my signature.

GEORGE I. RAY.